March 22, 1966     F. T. GOETZ     3,241,857
SPLASH GUARD WITH ADVERTISING POCKET
Filed June 9, 1964
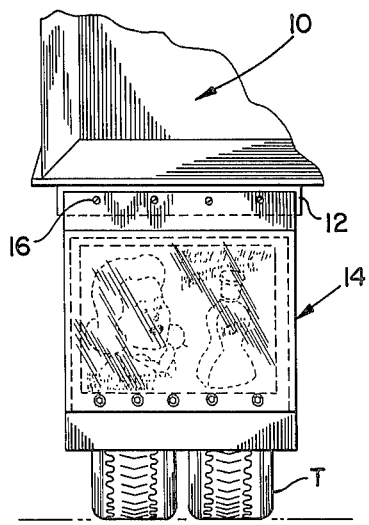
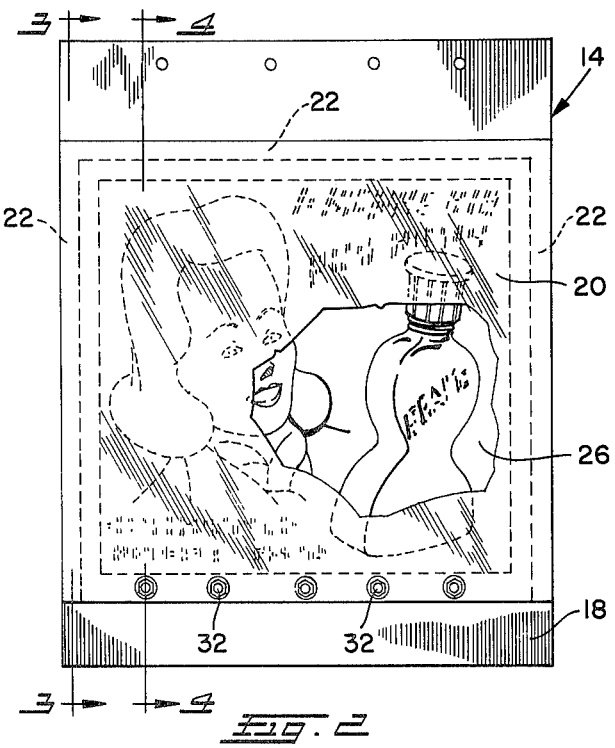
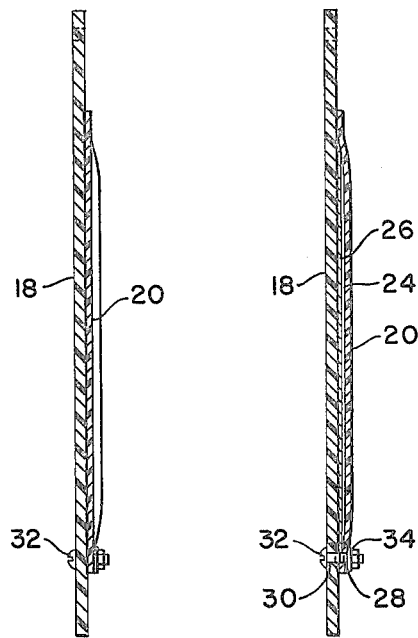
INVENTOR.
FRANK T. GOETZ
BY
Oberlin, Maky & Donnelly
ATTORNEYS United States Patent Office 3,241,857
Patented Mar. 22, 1966

3,241,857
SPLASH GUARD WITH ADVERTISING POCKET
Frank T. Goetz, 31656 Lake Road, Bay Village, Ohio
Filed June 9, 1964, Ser. No. 373,621
1 Claim. (Cl. 280—154.5)

The present invention relates generally to splash guards for trucks and like vehicles and relates more particularly as indicated to a splash guard provided with an advertising pocket.

A primary object of the present invention is to provide a splash guard having an advertising pocket adapted to loosely receive advertising material for visual observation from the rear of the vehicle on which the splash guard is mounted.

A further object of the present invention is to provide a splash guard with an advertising pocket wherein the advertising material can be quickly inserted or removed from the pocket, and wherein the material is protected while positioned in such pocket.

A further object of the present invention is to provide a splash guard having an advertising pocket constructed and arranged to permit removal of any condensation which may collect in such pocket.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is an end view of a vehicle having mounted thereon the splash guard of the present invention;

FIG. 2 is an enlarged front elevational view of the splash guard with the advertising material being disposed in the pocket, the cover portion of the guard being partially broken away to expose the advertising material;

FIG. 3 is a vertical sectional view taken on line 3—3 of FIG. 2; and

FIG. 4 is a vertical sectional view taken on line 4—4 of FIG. 2.

Referring now in more detail to the drawings, wherein like parts are indicated by like reference numerals, there is generally indicated at 10 a vehicle body, for example a truck trailer, which is adapted to have mounted thereon the splash guard of the present invention. It will be understood that the truck trailer merely exemplifies one type of vehicle with which the splash guard of the present invention could be associated. Secured in any suitable manner to the end of the trailer frame behind the tires T is a splash guard support 12 for mounting the splash guard, generally indicated at 14. The means for mounting the splash guard on the support forms no part of the present invention, comprising in the form shown a series of mounting bolts commonly designated at 16 which extend through aligned openings in the top of the splash guard 14 and the splash guard support 12 for mounting the splash guard thereto.

Referring to FIGS. 2–4, the splash guard 14 comprises a flat, preferably opaque plastic main body portion 18 and a clear plastic cover portion 20 adapted to overlie a substantial portion of the main body. The cover 20 is united to the main body 18 along both side edges and at the top edge of the cover, with such united areas being commonly designated at 22. Although it will be apparent that any suitable means can be employed for so uniting the cover and main body in such areas, e.g. plastic adhesive means, the uniting is preferably accomplished by heating the side and top edge portions of the cover and the contiguous portions of the main body to a fusing temperature.

The cover 20 thus forms with the main body 18 a pocket 24, FIG. 4, closed at both sides and the top and open at the bottom of the cover. In this manner advertising material 26 can be placed in the advertising pocket 24 through the open bottom end thereof. It will be seen that such advertising material when positioned in such pocket is protected from rain, dirt or other foreign matter.

To retain the advertising material 26 in the pocket, and to partially close the bottom open end thereof, the cover and main body are provided with a plurality of aligned openings 28 and 30 which are adapted to receive suitable fastening means such as, for example, nut and bolt means 32. The nut and bolt means 32 prevent the advertising material 26 from dropping out of the pocket 24 and additionally serve to prevent the entrance of foreign matter and the like into the advertising pocket at the otherwise open end thereof. Although there are five such nut and bolt means illustrated, with a washer 34 being provided with each set, it will be apparent that a greater or lesser number could be provided to accomplish the intended purpose. To insert or remove the advertising material from the pocket, the nut and bolt means are simply removed to make freely accessible the advertising pocket. In addition to the virtual preclusion of foreign matter and the like from entering the advertising pocket, any condensation forming within the pocket can freely pass therefrom through the open bottom areas between the fasteners.

It will thus be seen that the present invention provides a splash guard having a novel advertising pocket adapted to receive and retain advertising material therein. Such advertising material can be quickly inserted or removed from the pocket and is substantially completely protected from foreign matter and the like when disposed in such pocket. The splash guard with advertising pocket is, moreover, simply constructed and economical to manufacture.

Other modes of applying the principle of the invention may be employed, change being made as regards the details described, provided the features stated in the following claim or the equivalent of such be employed.

I therefore particularly point out and distinctly claim as my invention:

A splash guard for use with trucks or the like comprising a generally flat main body portion adapted to be mounted relatively adjacent the upper end thereof to splash guard support means, a transparent cover portion adapted to overlie a substantial portion of said main body portion, means for uniting said cover to said main body portion along the top and side edges of said cover whereby the latter forms with said main body portion an advertising pocket having an open bottom end through which advertising material can be inserted into said pocket for viewing through said transparent cover, said cover and said main body being formed with aligned openings relatively adjacent the bottom of said cover, and fastener means adapted to extend through said aligned openings for retaining said advertising material in said pocket.

References Cited by the Examiner

UNITED STATES PATENTS 2,361,479 10/1944 Joffo.
2,650,444 9/1953 Coyle _____ 40—16
2,844,388 7/1958 Rheeling _____ 280—154.5 X

FOREIGN PATENTS 1,060,275 6/1959 Germany.

BENJAMIN HERSH, *Primary Examiner.*

W. A. MARCONTELL, *Assistant Examiner.*